(12) United States Patent
Morley et al.

(10) Patent No.: US 9,559,900 B1
(45) Date of Patent: Jan. 31, 2017

(54) DEDICATED ENDPOINTS FOR NETWORK-ACCESSIBLE SERVICES

(71) Applicant: Amazon Technologies, Inc., Reno, NV (US)

(72) Inventors: Adam Douglas Morley, Seattle, WA (US); David Craig Yanacek, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 333 days.

(21) Appl. No.: 13/917,307

(22) Filed: Jun. 13, 2013

(51) Int. Cl.
   *G06F 15/177* (2006.01)
   *H04L 12/24* (2006.01)

(52) U.S. Cl.
   CPC ................................. *H04L 41/0806* (2013.01)

(58) Field of Classification Search
   CPC .......... H04L 63/10; H04L 9/32; G06F 15/177
   USPC ...................................................... 709/220
   See application file for complete search history.

(56) References Cited

U.S. PATENT DOCUMENTS

| | | | | |
|---|---|---|---|---|
| 7,716,180 | B2 * | 5/2010 | Vermeulen ........ | G06F 17/30212 707/626 |
| 7,801,912 | B2 | 9/2010 | Ransil et al. | |
| 8,166,063 | B2 * | 4/2012 | Andersen .......... | H04L 29/12132 707/706 |
| 2004/0003087 | A1 * | 1/2004 | Chambliss ......... | G06F 11/1076 709/226 |
| 2004/0243692 | A1 | 12/2004 | Arnold et al. | |
| 2009/0172782 | A1 | 7/2009 | Taglienti et al. | |
| 2010/0017545 | A1 | 1/2010 | Gildfind et al. | |
| 2011/0225165 | A1 | 9/2011 | Burstein | |
| 2011/0258179 | A1 | 10/2011 | Weissman et al. | |
| 2012/0173581 | A1 | 7/2012 | Hartig et al. | |
| 2012/0254258 | A1 | 10/2012 | Gao et al. | |
| 2012/0310965 | A1 | 12/2012 | Gao et al. | |
| 2013/0018989 | A1 | 1/2013 | Peek | |
| 2013/0110961 | A1 * | 5/2013 | Jadhav ............... | G06F 15/167 709/213 |
| 2013/0132854 | A1 * | 5/2013 | Raleigh ............... | G06F 3/0482 715/738 |

OTHER PUBLICATIONS

U.S. Appl. No. 13/780,077, filed Feb. 28, 2013, Swaminathan Sivasubramanian et al.
U.S. Appl. No. 13/174,189, filed Jun. 30, 2011, Swaminathan Sivasubramanian et al.

* cited by examiner

*Primary Examiner* — Wing F Chan
*Assistant Examiner* — Andrew Woo
(74) *Attorney, Agent, or Firm* — Robert C. Kowert; Meyertons, Hood, Kivlin, Kowert & Goetzel, P.C.

(57) ABSTRACT

Methods and apparatus for dedicated endpoint instances for network-accessible services are disclosed. The number of dedicated endpoint instances to be established to direct work requests of a given client to back-end nodes of a service may be determined. Configuration policies for the instances, including one or more policies related to caching, authentication, redundancy, durability, availability, and/or load balancing, may also be determined. Configuration of the instances may be initiated, and an indication that the endpoint or endpoints have been configured may be provided to the client.

20 Claims, 9 Drawing Sheets

DEDICATED ENDPOINTS FOR NETWORK-ACCESSIBLE SERVICES

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of physical and logical resources may be allocated to subscribers and/or their applications, such as whole physical or virtual machines, CPUs, memory, network bandwidth, I/O capacity, or bundled resources such as database servers, scientific computation clusters, and the like.

In many cases of bundled services, the core functions of the service are performed at secure servers or hosts, which may be termed back-end service nodes, that typically cannot be accessed directly from client devices. For example, in the case of network-accessible database services, a number of storage nodes may be established to store client database contents and to perform various types of reads, writes and other data extraction or manipulation operations on behalf of the clients. The clients may typically submit their work requests (e.g., read requests or write requests) to shared front-end intermediary nodes, which may be responsible for performing various types of validation operations on the request, and (for validated requests) transmitting internal representations of the work requests to the appropriate service nodes.

A number of factors may influence the implementation of such network-accessible services. For example, clients' throughput and response time requirements may have to be taken into account when deciding the set of resources to be allocated for the back-end service nodes. For some types of services, such as provisioned-throughput database services, each client-owned object (such as a database table) managed by the service may have an associated maximum throughput limit, and the operator of the service may distribute the object contents among various service nodes and their storage devices in such a way that, as far as the service nodes are concerned, the maximum throughput limits can be achieved under most operating conditions. However, under some circumstances, the overall client experience of the service may be affected not just by the back-end service nodes, but by the capabilities and configuration of the intermediary front-end nodes as well.

Figure 1:
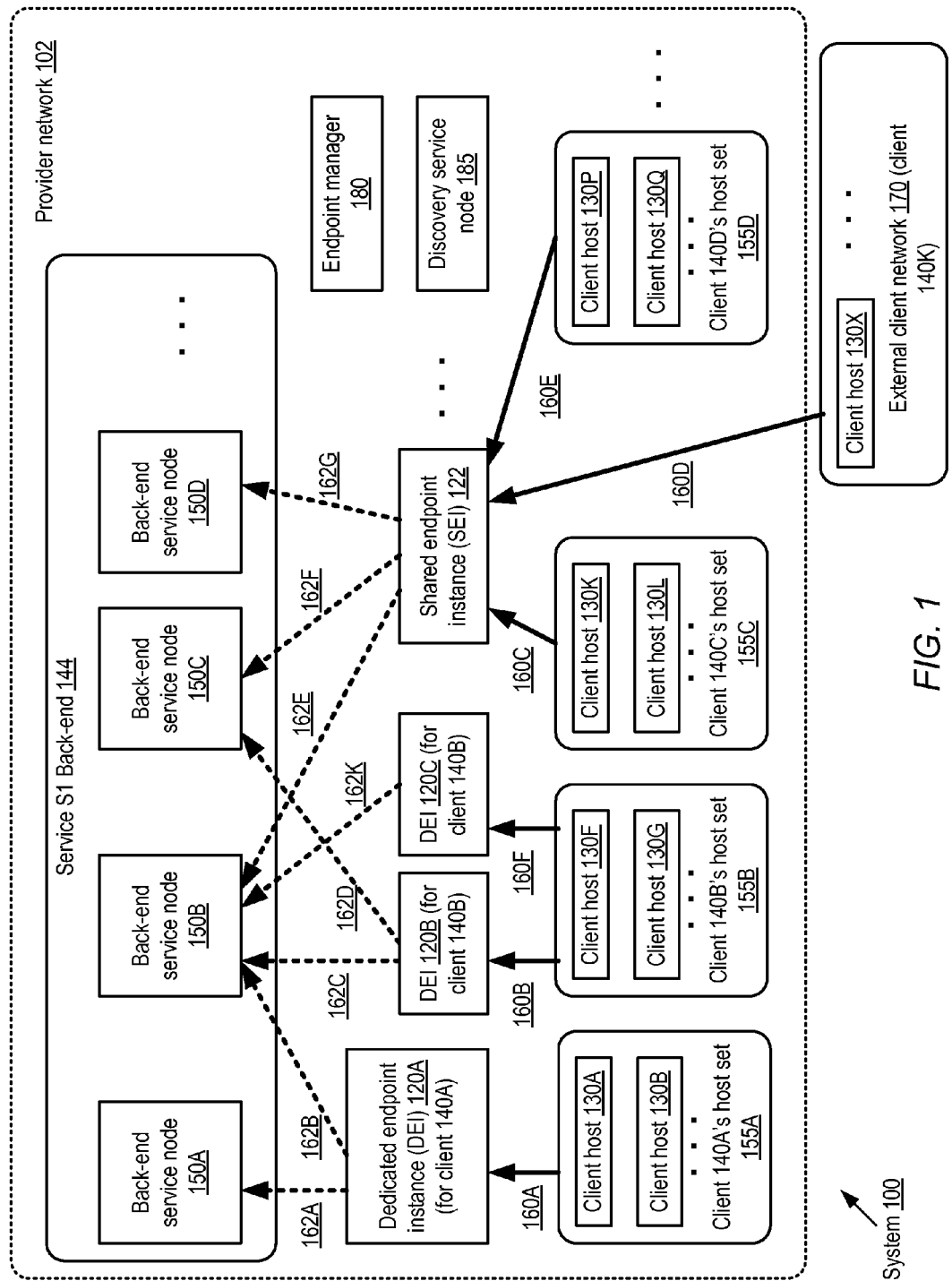
FIG. 1 illustrates an example of a system in which dedicated endpoint instances of a network-accessible service are deployed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing dedicated endpoints for network-accessible services are described. Networks set up by an entity such as a company or a public sector organization to provide one or more network-accessible services (such as various types of cloud-based storage, computing or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

In some embodiments, some or all of the provider network's services may be implemented using a collection of back-end servers, which may be termed "service nodes" herein, to which client work requests are typically directed by front-end nodes of the service, which may be termed "endpoint instances" or simply endpoints herein. Thus, in such embodiments, clients may not be able to access service nodes directly. At least for storage-related services and database services, various types of client-owned service-managed objects, such as database tables, storage volumes, file systems and the like, may be stored at service nodes. Service nodes may also be referred to as "storage nodes" for such types of services. For example, in some implementations, each service node may include one or more storage devices, at each of which portions or all of the client objects of one or more clients may be located. Service nodes that store data objects on behalf of multiple clients may be referred to herein as "shared" or "multi-client" service nodes, and storage devices that store contents of data objects belonging to respective clients may be referred to herein as "shared" or "multi-client" devices. When a client desires to read from, or write to, a data object, a corresponding read request or write request may be directed to an endpoint instance, and the endpoint instance may redirect the request (or an internal representation of the request) to the appropriate service node. The term "work request" may be used herein to refer collectively to a client request that may indicate one or more logical and/or physical data access (read), data modification (write), or computation operations to be performed on behalf of the client. In at least some implementations, the network-accessible service may set up some set of endpoints to be shared by multiple clients, and such endpoints may be referred to as shared endpoint instances or SEIs.

The responsibilities of an endpoint instance may include, for example, implementing programmatic interfaces to interact with clients (e.g., to receive client work requests and/or provide work responses to clients), performing various types of validations on received client work requests, selecting the appropriate set of backed service nodes to which representations of validated client requests are to be directed, and so on. In at least some embodiments, the service may enable clients to request the establishment of dedicated endpoint instances or DEIs—that is, endpoint instances that are responsible for handling work requests from a single client entity (which may include work requests from a plurality of applications or modules running at one or more hosts on behalf of the client). In at least some embodiments, the client applications may be executed at one or more hosts, which may be termed "client hosts" herein. In some embodiments, one or more client hosts may be implemented using another network-accessible service of the provider network. For example, a provider network may implement a virtualized compute service, allowing virtualized compute servers to be instantiated at client request, and some client applications that utilize dedicated endpoint instances of a database service of the provider network may be executed on such virtualized compute servers. Client applications may also run on client-owned physical and/or virtual servers external to the provider network in at least some embodiments.

According to one embodiment, an endpoint manager established for one or more network-accessible services implemented at the provider network may be configured to handle client requests for dedicated endpoint instances (DEIs). Such an endpoint manager may receive an endpoint establishment request from a client, indicating for example a particular network-accessible service and/or or one or more objects (e.g., database tables/partitions or storage objects) managed by the particular network-accessible service, to which work requests from the client are to be transmitted using one or more DEIs. The endpoint manager may determine (a) a number of DEIs to be established on behalf of the client, (b) a resource at which the DEI or DEIs are to be hosted, and (c) configuration policies for the DEI or DEIs, including one or more of a work request authentication policy, a caching policy, a redundancy policy, an availability policy, a durability policy for the client's data, or a load balancing policy. Additional details regarding the configuration policies (such as caching-related configuration settings and alternative authentication policies that may be supported) are provided below. In some embodiments, the endpoint establishment request may comprise one or more parameters that can be used to help determine the number or properties of the DEI(s) to be set up; in other embodiments, or if the client's request does not include the needed parameters, the endpoint manager may use default values for various properties and/or for the number of DEIs.

Having determined the number of DEIs to set up, the resources to be used, and the configuration properties, the endpoint manager may initiate the configuration of the DEIs. For example, in one embodiment, a particular virtual compute server implemented by another service of the provider network may be used to host a particular DEI. The endpoint manager may submit one or more commands to launch or instantiate the virtual compute server (if the virtual compute server is not already instantiated), and may then configure and initialize the virtual compute server to function as a DEI. After the DEI(s) have been established, in at least some embodiments the endpoint manager may notify the requesting client that the DEI(s) have been set up. In some embodiments, the client may be provided information (e.g., a network address or addresses) of a discovery service (e.g., a service similar to the Domain Name Service or DNS) from which the client may obtain the network addresses of the DEI(s); in other embodiments, the network addresses of the DEIs may be provided to the client by the endpoint manager itself. Subsequently, client work requests may be directed by the client to the DEI(s) assigned to the client. When a given work request is received by a particular DEI, a corresponding internal representation of the work request may be generated by the particular DEI, and directed to a chosen back-end service node from the DEI. In some implementations the internal representation may be very similar (or even identical) to the client-submitted work request. In at least some embodiments, a client may decide to use a DEI (instead of a back-end service node) as the primary repository of the client's data, at least for a while. For example, a client may load a data set at a DEI (e.g., either from an external source, from some back-end service node, or from a combination of sources), and subsequently submit work requests for local processing on the DEI, without requiring changes to the data to be written back to the back-end. In some such scenarios, the client may modify the durability policy or the redundancy policy to control whether the DEI is to be the primary repository or whether one or more copies of the data are to be written to back-end node(s).

At least in some embodiments, the use of dedicated endpoint instances (as opposed to shared endpoint instances) may help to reduce overhead associated with work requests, and may thereby enhance one or more performance characteristics (e.g., the average request latency) of the network-accessible service as perceived by the client. For example, because a DEI may typically be utilized from a set of devices owned by a single client, which may typically be part of a common security configuration (such as a group of client hosts that all use the same security protocol), the DEI may be able to reduce the number of times that authentication is performed and/or the amount of processing required for each authentication. Instead of authenticating each work request sent by any of the client devices, authentication may be performed on a once-per-connection basis in one implementation (e.g., when a connection to or from the DEI is initially established and the same connection is re-used for multiple work requests), and at least some of the subsequent work requests on the same connection may not need to be authenticated. In addition, the use of DEIs may help to enhance fault isolation from the perspective of the operator of the provider network. For example, if and when a failure occurs at a given dedicated endpoint instance, only the device or devices of a single client may be affected; in contrast, a failure of a shared endpoint instance may impact several clients.

In at least some embodiments in which the network-accessible service stores client data objects, clients may be able to use dedicated caches instantiated at the DEI(s) to improve performance. Thus, for example, in the endpoint establishment request (or in a separate cache configuration request), a client may indicate various desired caching properties, such as a size of the cache to be established, a cache filter indicating which subset of the client's data objects should be cached, or the coherency requirements for the cache in cases where multiple DEIs with respective caches are set up for the same client. In some embodiments, cache parameters may further specify whether only a volatile memory-based cache is to be set up, or whether a disk-and-memory based cache is to be set up. Other caching-related parameters may also be specified by clients in some embodiments, such as the sizes of data transfers for caching between the DEIs and the back-end service nodes, pre-fetch policies, whether a write-through or write-back cache is to be used, and the like. In at least some embodiments, clients may be enabled to disable caching upon request, or to flush cached writes upon request. In some embodiments a client may use the DEI cache as the primary repository for some set of client data, and control whether/when the data is written to back-end nodes by changing one or more policies such as a durability policy or a redundancy policy.

A number of different authentication policies may be supported in some embodiments, and the specific policy to be used may be determined based on some combination of client preferences, system defaults, and/or heuristics. For example, according to one embodiment, each work request received may be authenticated by a DEI; this approach may be termed per-work-request authentication, and may be the default behavior of shared endpoint instances. Per-work-request authentication may impose computation overhead and delay for each and every work request, and consequently more efficient approaches may be supported in some embodiments, although per-work-request authentication may continue to be offered as one of the supported alternatives. Since all the work requests to be handled by a given DEI may originate from devices owned/managed by a single entity, which may deploy a common shared security algorithm and may be deemed to trust each other, in some embodiments a minimal authentication policy may be used, in which only a few, randomly-selected work requests are authenticated. In one implementation a null authentication policy may be used, in which no authentication checks are performed, e.g., after an initialization phase of the DEI (the DEI may for example run some authentication checks for various client devices during startup, but once the client device identities have been determined, no additional authentication may be needed for subsequent requests from those devices). In some embodiments, persistent network connections may be maintained between clients and DEIs, and/or between DEIs and back-end service hosts. In some such embodiments, a one-per-connection authentication policy may be supported, in which each authentication is performed once for each new network connection, but not necessarily for each work request that is submitted over the connection. A time-bounded authentication policy may be used in some embodiments, such that a particular work request is selected for authentication based on the time that has elapsed since an earlier work request was selected for authentication—e.g., at least one work request may be authenticated once every minute. Periodic authentication may be used in one embodiment, in which at least one work request in every N work requests received is selected for authentication. In some cases a random authentication policy may be used, in which work requests are selected at random for authentication, or an account-based authentication policy may be used, in which a work request is selected for authentication based on the client with which the work request is associated (e.g., some clients may request higher rates of authentication than others, or the service may identify some clients for more extensive authentication than other clients). Various other approaches to reducing authentication overhead may be used in different embodiments.

Figure 4:
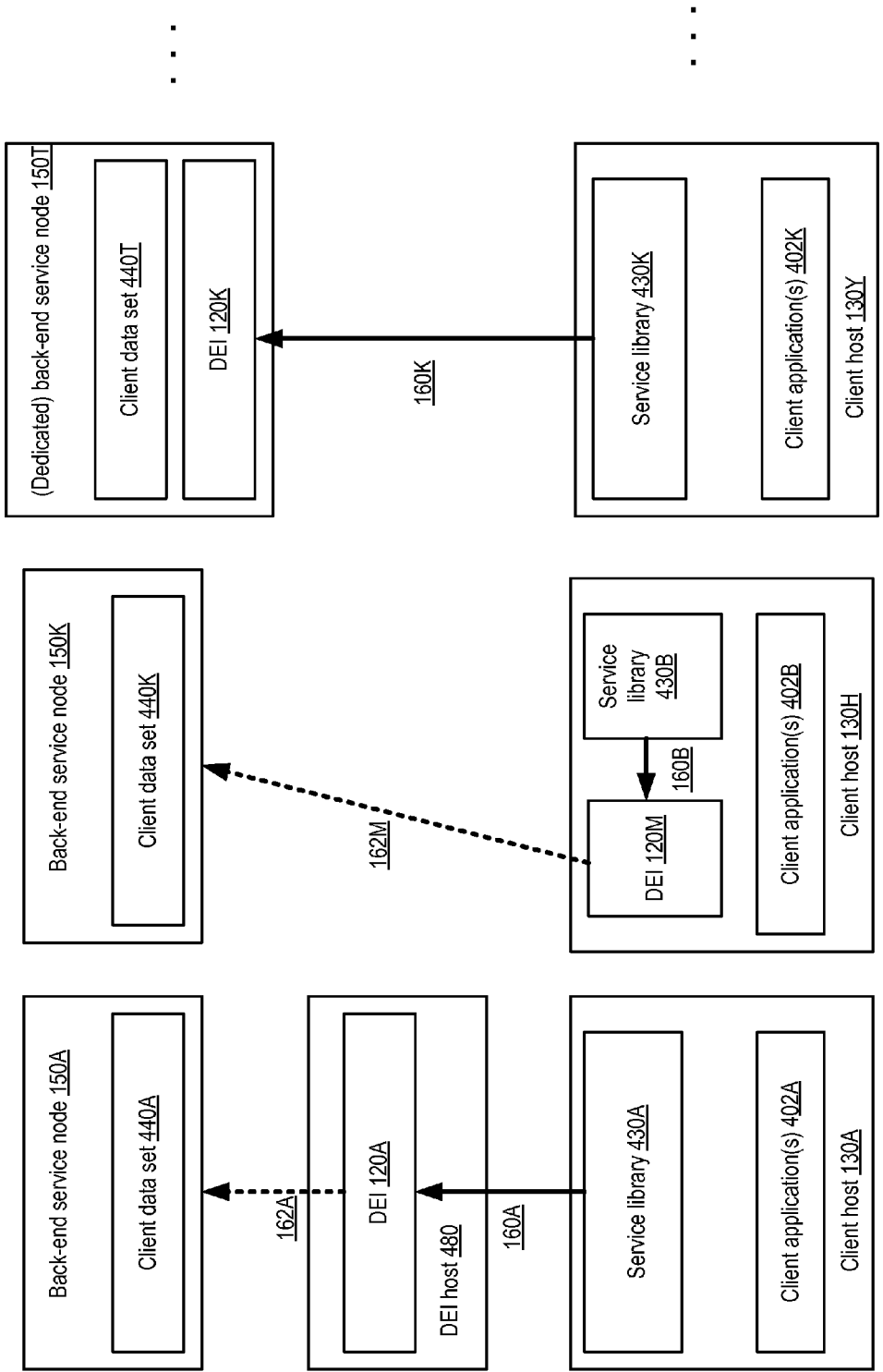
FIG. 4 illustrates example architectures for deployment of dedicated endpoint instances, according to at least some embodiments.

In at least some embodiments, as illustrated in FIG. 4, several alternative architectures may be used for DEI deployment. For example, consider a scenario in which a client application runs on a client host CH, and a set of work requests from the CH need to be directed to a back-end service node running on a back-end host BH. A DEI may be established on a third type of host (such as a virtual compute server set up specifically for the DEI) different from the hosts being used by the client and the back-end, in at least some embodiments. However, in some embodiments, support for a DEI on the back-end host BH itself may be provided. For example, a given client may be assigned the BH for exclusive use in some such embodiments, and the DEI may be launched on the same host. In other embodiments, support for DEIs on the client hosts such as CH may be provided. For example, a client-side library of the network-accessible service may be installed at the client host, and one of the components of the library may be capable of launching a local DEI on the client host. In at least some embodiments, clients may be able to indicate the type of DEI architecture they wish to utilize, or to specify the host type (e.g., back-end service node, client host, or a separate host for the DEI) that is to be used for a given DEI.

The number of DEIs that are to be established for a given client may be selected based on a variety of criteria in different embodiments. For example, in one implementation each data object (such as a database table or partition, or a storage volume) managed by a network-accessible service may have an associated provisioned throughput capacity limit, indicating a rate of work requests to be supported for the object. A database service in which the tables and/or table partitions each have associated provisioned throughput limits (e.g., each table or partition may have a respective provisioned read throughput R reads/second and a provisioned write throughput W writes/second, and the service may be obligated to support those throughput levels), may be termed a provisioned-throughput database service herein. In some such implementations, the number of DEIs to be set up for a given client and a given data object set may be determined based on provisioned throughput capacity limits—e.g., one DEI may be set up for every 1000 work requests per second. In at least some embodiments, a number of different types of hosts may be usable for DEIs (e.g., 4-processing-core hosts versus 16-processing-core hosts), and the number may be selected based on the performance characteristics or capabilities of the hosts available and/or other resources such as network links that may also be involved in the process of receiving, validating and directing work requests. In various embodiments, requirements related to one or more configuration policies of the DEIs, such as the redundancy policy, the availability policy, the load-balancing policy, the caching policy, and/or the durability policy may influence the number of DEIs that are established.

In some embodiments in which a plurality of DEIs are set up on behalf of a given client, the endpoint manager may also establish a dedicated set of load balancers to help spread the client workload among the DEIs, e.g., in accordance with a DEI load balancing policy. In at least one embodiment, the number of DEIs (and/or load balancers) used for a given client may be modified or automatically scaled over time by the endpoint manager, e.g., in response to metrics of the client workload or the utilization levels of the DEIs, back-end service nodes, or other resources.

Example System Environments

FIG. 1 illustrates an example of a system in which dedicated endpoint instances of a network-accessible service are deployed, according to at least some embodiments. As shown, system 100 includes a provider network 102 in which one or more network-accessible services are implemented for use by clients. One particular network-accessible service S1 is implemented using at least a set of back-end service nodes 150 (e.g., nodes 150A, 150B, 150C and 150D), which may be collectively referred to as the service S1 back-end 144. For example, if network-accessible service S1 is a database service or a storage service, each of the back-end service nodes 150 may comprise a storage server or storage node, with one or more attached storage devices such as various types of disk-based storage, solid-state storage, or and/volatile storage.

As shown, clients (e.g., client application programs or modules, or individual users utilizing a human-friendly interface such as a web page) may access the service from various client hosts 130, such as client hosts 130A, 130B, 130F, 130G, 130K, 130L, 130P, 130Q and 130X. Some client hosts 130 may be implemented within the provider network 102, e.g., using a virtual computing service implemented by the provider network, while others may be located outside the provider network 102. In the depicted embodiment, clients hosts belonging to (or assigned to) five different clients are shown. Client 140A, for example, has an associated client host set 155A comprising client hosts 130A and 130B. Client 140B has client host set 155B comprising client hosts 130F and 130G, client 140C has client host set 155C comprising client hosts 130K and 130L, and client 140D has client host set 155D comprising client hosts 130P and 130Q. Client 140K submits work requests for the service S1 from an external client network 170 comprising client host 130X, while the remaining clients' hosts shown are implemented using resources of the provider network 102. In general a given client 140 may issue work requests (such as requests for reads, writes, or computations) from any combination of client hosts inside or outside the provider network in at least some embodiments. In at least one embodiment the costs to the client of using the service may depend at least in part on which types of network paths were used (e.g., if work requests and responses use paths completely within the provider network 102, or completely within a given geographical region or data center of the provider network, a different billing rate may be charged for network transfers associated with the work requests than if external network paths such as portions of the public Internet are used).

In the depicted embodiment, an endpoint manager 180 may be responsible for setting up endpoint instances to direct work requests to the appropriate back-end service nodes on behalf of the clients. Generally speaking, an endpoint instance may comprise a device comprising one or more hardware and/or software components with a communication target (such as an Internet Protocol (IP) address) that is accessible from a client host. In the depicted embodiment, the endpoint manager 180 may be capable of establishing at least two types of endpoint instances: dedicated endpoint instances (DEIs) 120 and shared endpoint instances (SEIs) 122. In other embodiments, only DEIs or only SEIs may be supported. A given dedicated endpoint instance, such as DEI 120A, 120B, or 120C, may be responsible for directing work requests from one client 140 to some set of back-end service nodes. For example, DEI 120A receives work requests from the client hosts (such as 130A and 130B) of client 140A, as indicated by the arrow 160A, and directs them to back-end service nodes 150A and/or 150B (arrows 162A and 162B) based on the nature of the work requests. Similarly, DEIs 120B and 120C are responsible for directing client 140B's work requests, as indicated by arrow 160B and 160F emanating from client host set 155B, to back-end service nodes 150B and/or 150C (as indicated by arrows 162C, 162D and 162K). As mentioned above, in some cases a DEI 120 may be configured at least temporarily as the primary repository of some set of client data, and in such a scenario much or all of the processing related to client work requests may be done at the DEI. A given shared endpoint instance 122, in contrast to DEIs 120, may be responsible for handling work requests originating from a plurality of clients such as 140C, 140D and 140K in the depicted embodiment, as indicated by the arrows 160C, 160D and 160E, and directing them to the appropriate back-end service nodes such as 150B, 150C and 150D (arrows 162E, 162F and 162G).

It is noted that although, for clarity, only a single SEI 122 is illustrated in FIG. 1, in general multiple SEIs may be set up in at least some embodiments. For example, by default, in one embodiment, an endpoint manager may establish a plurality of SEIs 122 for use by those clients that do not require, or do not wish to use, DEIs. In some embodiments, all clients may be required to utilize DEIs; that is, SEIs may not necessarily be implemented. In some cases, load balancers may also be set up for clients that utilize DEIs and/or SEIs; an example of the use of multiple DEIs 120 with load balancing is illustrated in FIG. 4 for one embodiment. Generally speaking, in embodiments in which service S1 stores client data, a given back-end service node 150 may be responsible for storing data of one or more clients, although some back-end service nodes 150 may be reserved for exclusive use by a given client 140 in some embodiments. Although the DEIs 120 are shown as distinct entities separate from client hosts 130 and back-end service nodes 150 in FIG. 1, in at least some embodiments at least a portion of DEI functionality may be implemented at the client hosts 130 and/or the back-end service nodes 150. In some implementations the functionality of a given DEI or SEI may be implemented in a distributed fashion, employing a plurality of computing devices. Although client 140K, the only example shown in FIG. 1 of a client utilizing a client host 130X external to the provider network 102, is shown using a shared endpoint instance, in general DEIs 120 may be used from either within or outside the provider network 102. In some cases a given client's hosts may include some hosts inside the provider network 102, and other hosts outside the provider network 102, and a common DEI or set of DEIs may be established for use from all the client's hosts in some embodiments. In one embodiment, a client that utilizes more than one network-accessible service of the provider network 102 may set up respective, distinct DEIs for each service, while in other embodiments a given DEI set up for one client may be responsible for directing work requests to more than one service.

In the depicted embodiment, the endpoint manager may establish the DEIs 120 at client request, e.g., in response to an endpoint establishment request. An endpoint establishment request may be issued by or on behalf of a given client (e.g., by an application or module, or by a human user such as an administrator), and may indicate various preferences and/or requirements of the client. In at least some embodiments, the endpoint establishment request may indicate, either directly or indirectly, the specific data objects or back-end service nodes to which the requested DEI(s) are to direct work requests. In some embodiments, the endpoint manager 180 may be able to infer the target set of back-end service nodes 150 (e.g., by consulting a service database for service S1 that indicates which objects and which back-end nodes are accessible by a given client). In response to the endpoint establishment request, the endpoint manager 180 may in one embodiment determine how many DEIs 120 to set up, the specific resources or locations at which the DEIs should be set up, and/or various configuration policies applicable to the DEIs, such as various caching and authentication policies described in further detail below.

Having determined the number and properties of the DEIs to be established, the endpoint manager 180 may in some embodiments initiate the configuration of the DEIs. After the DEI(s) have been configured (which may involve instantiating or starting up new hosts, processes or hardware/software modules in at least some cases), in at least some embodiments the endpoint manager 180 may provide an indication to the requester that the DEI(s) are available for access. In one embodiment, the client may be notified of a discovery service (such as a service implemented at least in part using discovery service node 185) that can be queried to obtain the network address(es) of the DEIs set up for the client. In some implementations, the endpoint manager 180 may itself provide the network coordinates (e.g., IP address) of the DEIs 120 to the client. In at least one embodiment, the endpoint manager 180 may instantiate a pool of DEIs from which particular DEIs are selected for allocation to any given client as needed. In such a scenario, instead of incurring the overhead of launching a new host or a new process or module, the endpoint manager may simply select a currently-unallocated DEI from the pool and configure the selected DEI appropriately for the requesting client. In at least some embodiments, the endpoint manager 180 may be implemented in a distributed fashion, e.g., including a plurality of hardware and/or software components which may be spread across a plurality of data centers or geographical regions of the provider network 102.

After the client is informed that the DEI(s) have been set up or configured appropriately, work requests directed to the service S1 may be transmitted to the DEIs 120 set up exclusively for the client. Upon receiving a particular work request from a client, a DEI 120 may in some embodiments validate the request, and send a corresponding representation of at least some operations indicated in the work request to one or more back-end service nodes 150 in the depicted embodiment. In general, the types of operations performed at an SEI 122 may be similar to those performed by a DEI 120; however, typically, the resources consumed (e.g., processor cycles and/or memory) at a given endpoint instance for validation may be substantially lower at a DEI than at an SEI. Furthermore, the performance achieved for work requests by a client may be superior if DEIs are used rather than SEIs, in at least some implementations, since the DEI's processing, memory and storage capabilities are reserved for the exclusive use of the client.

Figure 2:
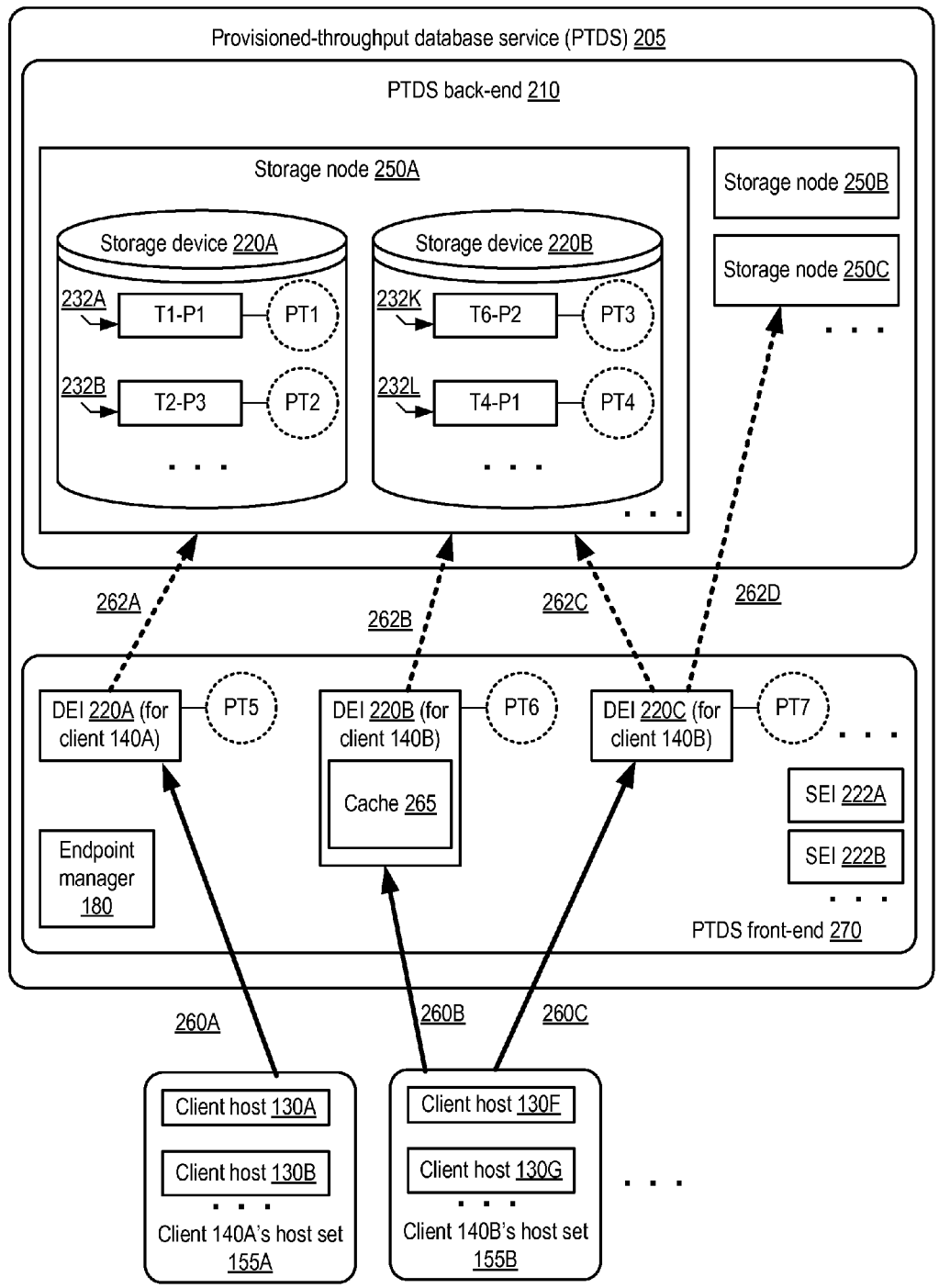
FIG. 2 illustrates an example provisioned-throughput database system in which dedicated endpoint instances may be deployed, according to at least some embodiments.

FIG. 2 illustrates an example provisioned-throughput database system (PTDS) 205 in which dedicated endpoint instances may be deployed, according to at least some embodiments. As shown, PTDS 205 may include PTDS back-end 210 and PTDS front-end 270 in the depicted embodiment. The PTDS back-end 210 may include a plurality of storage nodes 250 (which may be considered examples of back-end service nodes 150 of FIG. 1), such as storage nodes 250A, 250B and 250C. Each storage node 250 in turn may include one or more storage devices 220, such as storage devices 220A and 220B at storage node 250A, at which portions of a client's data are stored. (Due to limited space, the storage devices of storage nodes 250B and 250C are not shown in FIG. 2.) In the illustrated PTDS 205, client data is organized into table partitions 232 (i.e., each database table is divided into one or more partitions 232), and each partition is shown using the naming convention "Tm-Pn" to represent the nth partition of table Tm. On storage device 220A, partitions 232A (T1-P1) and 232B (T2-P3) are shown, while on storage device 220B, partitions 232K (T6-P2) and 232L (T4-P1) are shown. Generally speaking, on any given storage device 220 and on any given storage node 250, partitions belonging to any number of clients may be stored in at least some embodiments. Each partition 232 has an associated provisioned throughput capacity or level (e.g., a number of operations per second to be supported for the partition, such as reads per second, writes per second or combined reads and writes per second), as indicated by the "PT" labels attached to the partitions in FIG. 2. For example, the provisioned throughput capacities of partitions 232A, 232B, 232K and 232L are shown as PT1, PT2, PT3 and PT4 respectively. For any given partition 232, the particular storage node 250 and/or the particular storage device 220 used may have been selected in order to ensure that the corresponding provisioned throughput can (at least under most operating conditions) be supported with a high probability. Provisioned throughput capacities may be set at the time of table or partition creation in at least some embodiments, e.g., when a client submits the equivalent of a "create table" request to the PTDS 205, the provisioned throughput capacities of the table's partitions (and in some cases the number of partitions) may be provided as parameters in the request, or may be selected by the PTDS using default settings.

Endpoint manager 180 for PTDS 205 may be configured to set up endpoint instances, including DEIs as well as SEIs, for use by various clients in the depicted embodiment. (The DEIs 220 shown in FIG. 2 for a provisioned-throughput database service 205 may be considered examples of the more general DEIs 120 shown in FIG. 1.) For example, as shown, DEI 220A has been set up for client 140A's requests (indicated by the arrow labeled 260A), received from client host set 155A comprising client hosts 130A and 130B. DEIs 220B and 220C have been set up for client 140B's requests (indicated by arrows labeled 260B and 260C), received from client host set 155B comprising client hosts 130F and 130G. PTDS front-end 270 also comprises SEIs 222A and 222B in the depicted embodiment, which may be set up for use by other for which DEIs 220 are not established. In at least some embodiments, even a client that has a DEI 220 established may be able to submit work requests to an SEI 222, at least under some circumstances (e.g., if connectivity is lost to the client's DEIs 220). SEIs 222 may be considered backup endpoints in such embodiments, to be used if a DEI is not available for use for any of various reasons, e.g., if a DEI was not set up at all, or if a DEI becomes unavailable or overloaded.

Arrows 262 indicate the transmissions of internal representations of work requests from endpoints to the storage nodes 250 in the depicted embodiment. For example, DEI 220A may send such representations 262A to storage node 250A in response to work requests 260A from client 140A. DEI 220B may send representations 262B of work requests 260B to storage node 250A on behalf of client 140B, while DEI 220C may send representations 262C and 262D of work requests 260C from client 140B to storage nodes 250A and 250C respectively.

In the embodiment illustrated in FIG. 2, each DEI 222 may also have an associated provisioned throughput capacity, indicated by a respective "PTx" value, in a manner analogous to the provisioned capacity levels at the table partitions 232. Thus, DEI 222A has a provisioned capacity of PT5 operations (e.g., reads, writes, or combinations of reads and writes) per second, DEI 222B has a provisioned capacity of PT6 operations/second and DEI 222C has a provisioned capacity of PT7 operations per second. The endpoint manager 180 may be responsible for assigning the provisioned capacity limits to each DEI 222 in the depicted embodiment, e.g., based on the provisioned capacities of the table partitions for which requests are to be directed by the DEI 222 and/or based on client specifications or preferences. Thus, in one implementation, if a given client is to access a set of partitions with a total provisioned throughput capacity PT-total using DEIs, the endpoint manager 180 may be responsible for setting up enough DEIs to support PT-total operations per second. In some embodiments, provisioned throughput capacities may not be assigned to DEIs.

Some DEIs, such as DEI 222B in FIG. 2, may be configured with caches (e.g., cache 265) that can store portions or all of the table partitions of the client associated with the DEI. For example, a client may specify various caching parameters or requirements in an endpoint establishment request, and the endpoint manager 180 may establish caches appropriately at the DEI(s) set up in response to the establishment request. In at least some implementations in which multiple DEIs are set up for a given client, not all the DEIs may have to be configured symmetrically with respect to caches—e.g., one DEI 222 may have a cache of a particular size set up, another DEI may have a smaller cache, while a third DEI may have no cache at all. In other embodiments, symmetric caching may be required, e.g., each DEI 222 may have to be configured with similar or identical caching parameters. Various types of cache coherence and/or invalidation mechanisms may be employed in different embodiments in which DEI caching is supported.

Example DEI Components

Figure 3:
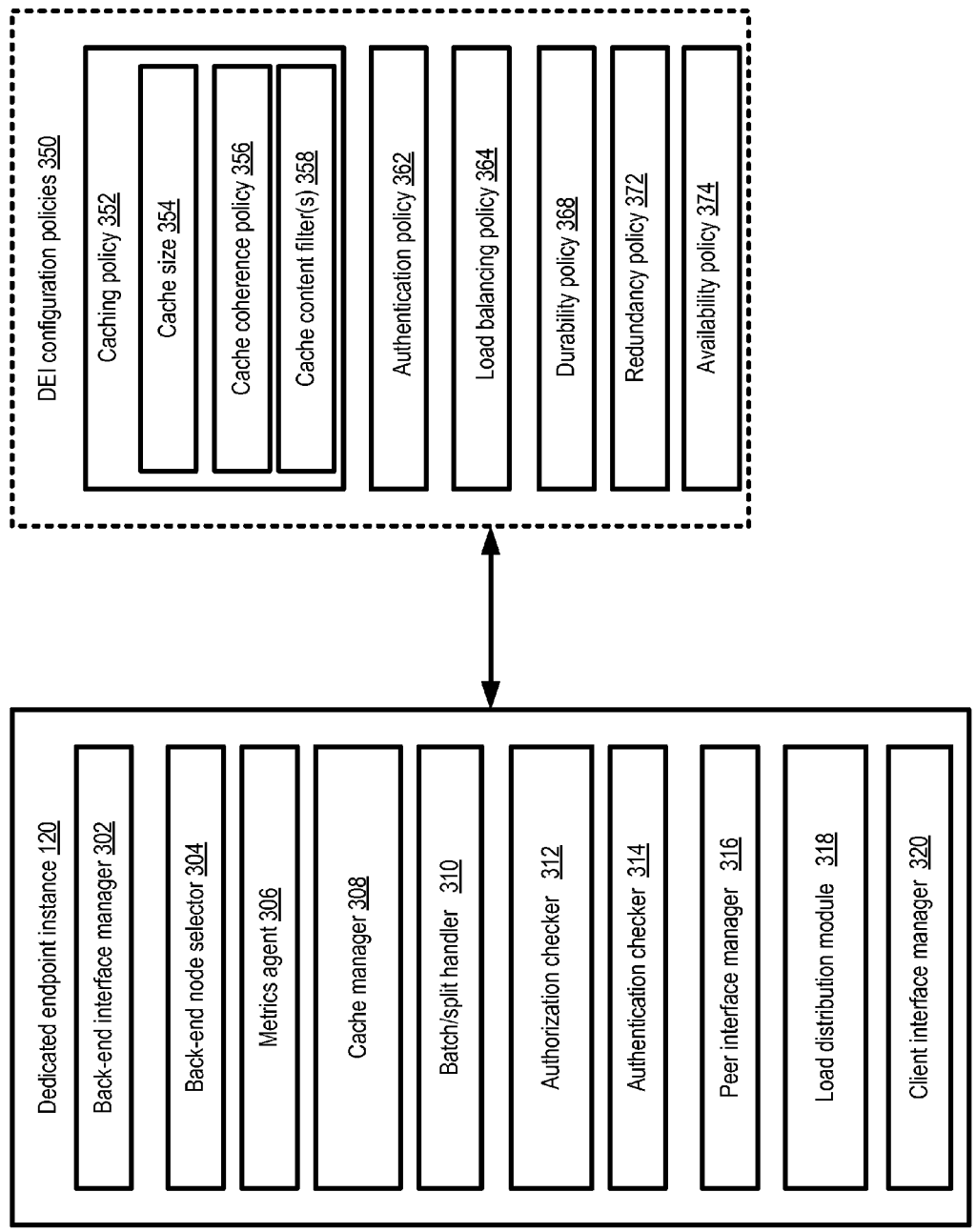
FIG. 3 illustrates example constituent elements of a dedicated endpoint instance and associated configuration policies, according to at least some embodiments.

FIG. 3 illustrates example constituent elements of a dedicated endpoint instance 120 (or 222) and associated configuration policies 350, according to at least some embodiments. As shown, the DEI 120 may comprise three components for interacting with other types of entities in at least one embodiment: a client interface manager 320, a back-end interface manager 302, and a peer interface manager 316. The client interface manager 320 may be configured to receive client work requests, configuration requests and the like. In some embodiments, responses (e.g. read data in the case of read work requests, or write acknowledgements in the case of write work requests) to the client's work requests may also be routed via the DEI 120, and the client interface manager 320 may transmit or transfer the responses. The back-end interface manager 302 may be configured to transmit internal representations or translations of client work requests to the appropriate back-end service nodes 150 in the depicted embodiment. The peer interface manager 316 may be responsible for communicating with other DEIs set up on behalf of the client, e.g., in accordance with a redundancy policy 372, an availability policy 374, or a durability policy 368 in use for the client's DEIs. In one implementation, for example, the client may request N-way redundancy (or the endpoint manager 180 may implement N-way redundancy, whether the client requests redundancy or not), and N DEIs may be set up corresponding to every DEI that would have been set up for performance reasons alone. The set of DEIs that are established for a given client may be referred to as peers of each other, and peer interface manager 316 may be used for peer-to-peer communications (e.g., for health or status checks, or for cache invalidations or coherency as described below). In various embodiments the interface managers 320, 316 and 302 may implement or use respective sets of programmatic interfaces (e.g., application programming interfaces or APIs) and respective protocols (e.g., networking protocols, compression protocols, security protocols and the like). In some embodiments all the interactions between the DEI 120 and other entities may be managed by a single interface manager.

In some embodiments, a DEI 120 may include a load distribution module 318, e.g., in accordance with load balancing policy 364. The load distribution module at a given DEI 120 may, for example, identify peer DEIs to which work requests can be redirected in the event of overload being detected at the given DEI. In some embodiments, if multiple DEIs are set up on behalf of a client, a load distribution module 318 at one or more of the DEIs may serve as a load balancer and distribute incoming work requests among the remaining peers.

Authentication checker 314 may be responsible for implementing an authentication policy 362 established for the DEI. Several alternative authentication policies may be supported in some embodiments, with respective varying amounts of overhead imposed on work requests. For example, a straightforward and conservative (but potentially higher-overhead) authentication policy 362 may require than every work request received at the DEI be authenticated. A less conservative, and lower-overhead, authentication policy may involve authenticating once per connection established between a client and the DEI, such that the authentication overhead can at least in principle be amortized over several work requests that may use the same connection. In some embodiments, for example where the client hosts are all trusted elements of a secure environment, a null authentication policy may be used, according to which work requests received from a trusted set of hosts or application processes may not have to be authenticated at all. Various other authentication polices (such as time-bounded authentication, periodic authentication, account-based authentication, or random authentication, as described earlier) may also or instead be supported in different embodiments, such as a minimal or random authentication policy in which randomly selected work requests are authenticated.

Authorization checker 312 may be configured to verify that the requesting client is authorized to perform the operations indicated in a given work request in some embodiments. For example, in an embodiment in which the network-accessible service supports reads and writes on database objects stored at the back-end service nodes, some client processes or threads may only be granted read access to a given object, while other client processes or threads may be granted read and write access. In such scenarios, the authorization checker 312 may be responsible for verifying that the requester has the appropriate permissions on the work target (e.g., the database table or partition, or the storage object).

In the depicted embodiment, batch/split handler 310 may be responsible for determining whether a given client work request should be split into multiple internal requests to be sent to the back-end service nodes, or whether multiple client work requests should be combined into a single internal back-end request. In some implementations, for example, clients may be enabled to submit special "batched" work requests, and the batch/split handler 310 may be capable of determining exactly how the batched work requests should be mapped to internal work requests at the back end. Combining and/or dividing client work requests may be done for functional reasons (e.g., if the set of data that has to be read in accordance with a single work request is too large to fit into one transfer, or is distributed across multiple back-end service nodes), performance reasons (e.g., if different portions of a read request can be handled more quickly from multiple back-end service nodes than from a single back-end service node), data durability reasons (e.g., writes may have to be directed to multiple replicas at the back-end service nodes), or for some combination of such reasons in various embodiments.

Cache manager 308 may be configured to manage a cache (such as cache 265 of FIG. 2) established on the client's behalf at the DEI 120 in embodiments involving storage services and/or database services. A caching policy 352 may determine various caching parameters, such as the cache size 354, the cache coherence policy 356 to be used if multiple DEIs establish respective cache instances on behalf of the same client, cache content filter(s) 358 to identify the subsets of client data that are to be cached, may be selected based on client input in some embodiments.

A metrics agent 306 may be responsible for collecting various metrics at the DEI in some embodiments, such as the total number of work requests received, the fraction of the work requests that succeeded within a given response time limit, the fractions of different types of work requests (e.g., reads versus writes), cache hit rates, the networking bandwidth used during some time period at the DEI for incoming and/or outgoing network transfers, and so on. In at least some embodiments some of the metrics may be made accessible for viewing and/or analysis by clients, service administrators, and/or by the endpoint manager 180. Back-end node selector 304 may be responsible for identifying the specific set of back-end service nodes to which the representations of the client work requests are to be sent. It is noted that in various embodiments, not all the components illustrated in FIG. 3 may be implemented, and that in some embodiments, additional DEI components not shown in FIG. 3 may be implemented.

DEI Deployment Architectures

FIG. 4 illustrates example architectures for deployment of dedicated endpoint instances, according to at least some embodiments. Any combination of the three deployment types illustrated, each shown in conjunction with a respective client host 130 (i.e., 130A, 130H and 130K) and a respective back-end service node 150, may be supported in a given implementation.

Client host 130A comprises client application process(es) 402 and a service library 430A. The service library 330A may include installable modules supporting a variety of programmatic interfaces that enable the client processes 402 to submit work requests directed to the client's data set 440A (e.g., a set of storage volumes, database tables or partitions) at back-end service node 150A. A DEI 120A is instantiated at a DEI host 480, distinct from the client host 130A and the back-end service node 150A at which the client's data set 440A is stored. When work requests are received at DEI 120A (as indicated by the arrow 160A), they may be validated, and internal representations of the validated work requests may be transmitted to the back-end service host 150A (as indicated by arrow 162A). The deployment approach illustrated for DEI 120A may be referred to as an "independently hosted DEI" architecture.

A "client-hosted DEI" architecture is implemented for DEI 120M, used for the work requests of client applications 402B at client host 130H. In the depicted embodiment, DEI 120M is instantiated at the client host 130H itself, and a separate host specifically for the DEI is not required. The DEI 120M may be launched, e.g., as a separate process or thread in some implementations, by invoking a component of service library 430B. DEI 120M may submit the representations of the client's work requests directly to the service back-end node 150K at which the client application's data set 440K is stored.

A "back-end" DEI architecture is used for application processes 402K at client host 130Y. In this example scenario, the DEI 120K is implemented at the service back-end node 150T. Service library 430K enables the client applications 420K to communicate with the back-end service node 150T. In at least some embodiments in which the DEI is implemented at a service back-end node 150, the back-end node itself may be configured for exclusive use by the same client for which the DEI is established. It is noted that in each of the example architectures illustrated in FIG. 4, the DEI shown (e.g., DEI 120A, 120M or 120K) may be configured to receive client work requests from a plurality of client hosts, although only a single client host is shown for each scenario in FIG. 4. Supporting the various approaches to DEI deployment may enable the operator of the provider network substantial flexibility in deciding the placement of DEIs and may lead to greater efficiencies with respect to host utilizations than may otherwise be possible. It is noted that the service library 430 that may be installed at a given client host 130 may comprise modules to support any or all of the different architectures illustrated in FIG. 4 in some embodiments (i.e., different libraries may not be required for different deployment architectures in such embodiments).

Figure 5:
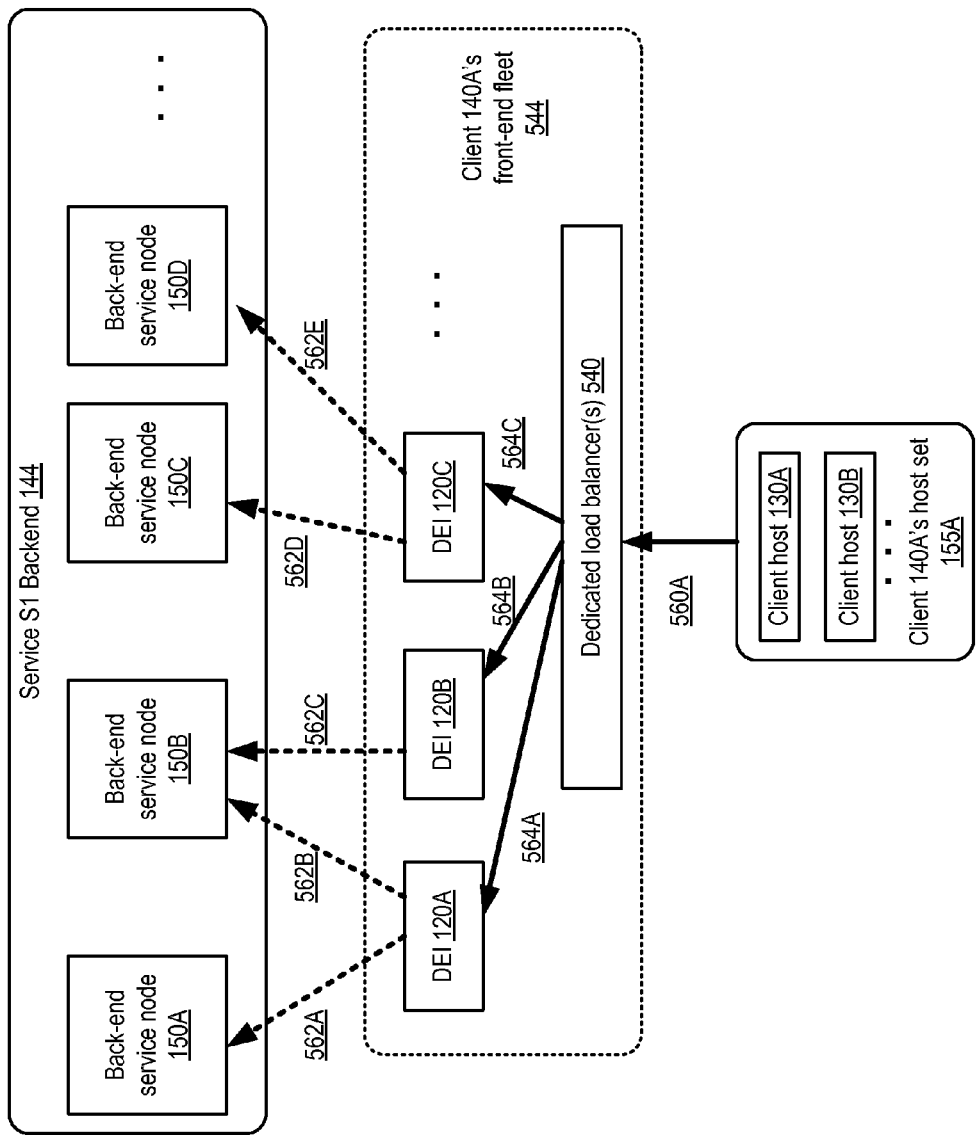
FIG. 5 illustrates an example configuration in which a fleet of front-end nodes including dedicated endpoint instances and one or more load balancers may be deployed, according to at least some embodiments.

FIG. 5 illustrates an example configuration in which a fleet of front-end nodes including dedicated endpoint instances and one or more load balancers may be deployed, according to at least some embodiments. As described above, in some embodiments, a given client may be provided with multiple DEIs to which work requests may be sent from the client's host set. In the embodiment depicted in FIG. 5, client 140A's host set 155A includes client hosts 130A and 130B. A front-end fleet 544 for exclusive use by the client 140A has been established, including a plurality of DEIs 120A, 120B, 120C, and one or more dedicated load balancers 540. The client work requests from the various client hosts 130 may all be initially sent to the load balancer 540 (or, in cases where multiple load balancers are set up, to one of the load balancers 540) in accordance with a load balancing policy established for the DEIs, as indicated by the arrow labeled 560. The load balancer(s) 540 may transmit a given work request to a particular DEI 120 selected in accordance with a load balancing algorithm (e.g., round-robin load balancing, DEI-utilization-based load balancing, affinity-based load balancing, or the like).

The selected DEI may then transmit an internal representation of the work request to one or more service back-end nodes 150, as indicated by the arrows 562A, 562B, 562C, 562D, and 562E. In some embodiments, a particular DEI may be configurable to perform load balancing, as indicated earlier in the discussion of load distribution module 318 of FIG. F, e.g., instead of or in addition to performing the other DEI functionality described earlier. It is noted that various combinations of architectures similar to those illustrated in FIG. 4 may be employed for the front-end fleets that also include load balancers in some embodiments. For example, a given front-end fleet may include client-hosted DEIs as well as independently hosted DEIs in at least some embodiments, either in combination with, or without, client-hosted load balancers or independently hosted load balancers.

In various embodiments, a number of pricing policy alternatives may be available to bill clients for the use of DEIs and/or dedicated front-end fleets. According to one pricing policy, clients may be charged for DEIs implicitly, based on the provisioned throughput capacity limit associated with client data objects such as database tables, partitions, or storage volumes. According to another pricing policy, clients may be asked to pay for each DEI instance and/or dedicated load balancer instance established on their behalf. In yet another approach, clients may be charged for DEIs based on the sizes of the caches established on their behalf at the DEIs, or charged for DEI use per work request. Any of various combinations of such pricing approaches may be used in some embodiments.

Endpoint Establishment Requests

Figure 6:
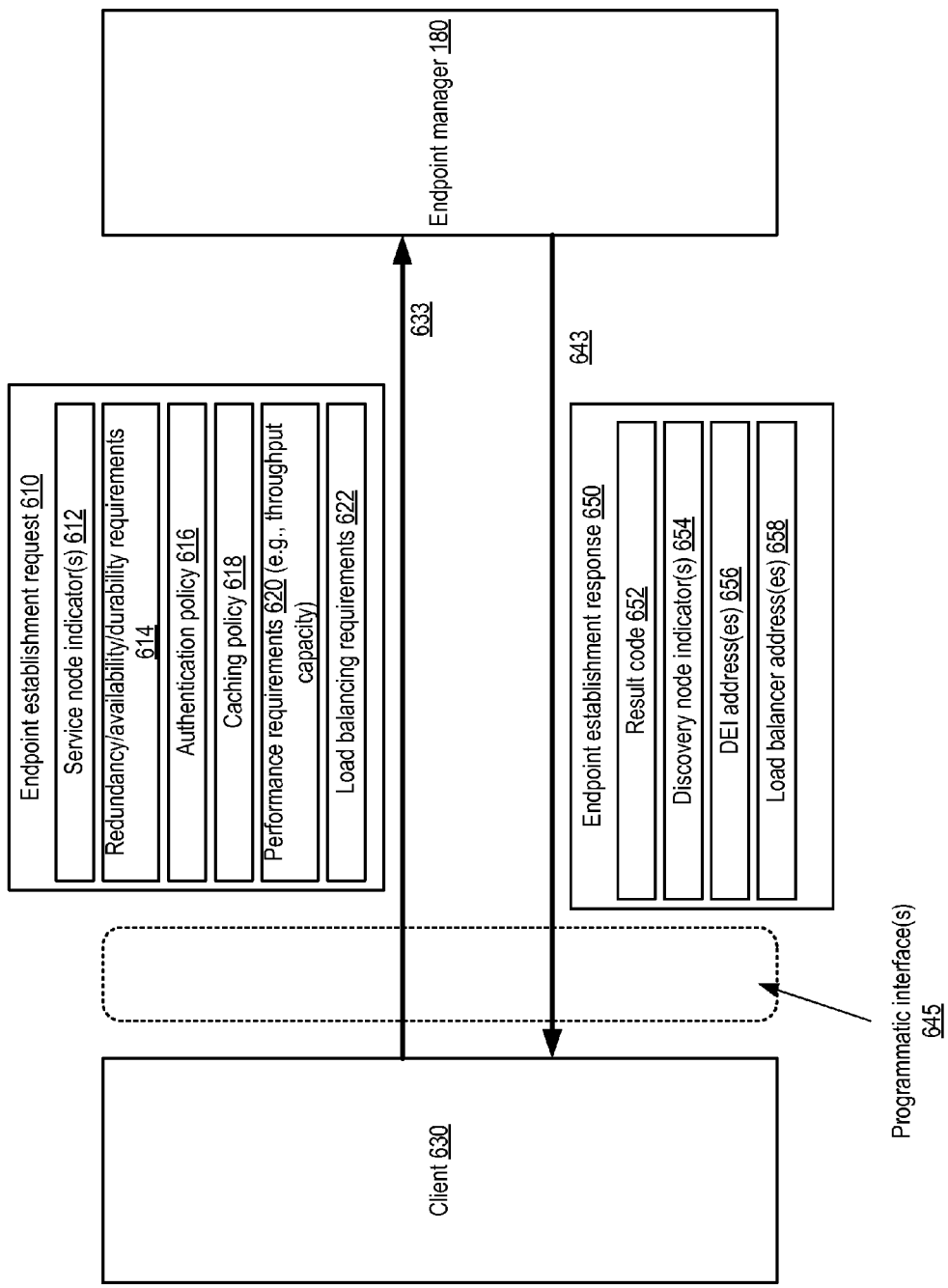
FIG. 6 illustrates example constituent elements of endpoint establishment requests and endpoint establishment responses, according to at least some embodiments.

FIG. 6 illustrates example constituent elements of endpoint establishment requests and endpoint establishment responses, according to at least some embodiments. As shown, in the depicted embodiment, one or more programmatic interfaces 645 (such as APIs or web pages) may be implemented by the endpoint manager 180 to enable interactions with clients. A client 630 (e.g., an application program or module run at a client host 130, or a user/administrator using one of the programmatic interfaces 645) may submit an endpoint establishment request 610 to endpoint manager 180, as indicated by arrow 633. In some embodiments, the DEIs may be established at the time that the client subscribes to, or initially interacts with, the service being implemented; in other embodiments, a client may request additional DEIs at any time.

As shown, the endpoint establishment request 610 may include several constituent elements in the depicted embodiment, at least some of which may be used to determine the configuration policies 350 of the DEIs. For example, the request 610 may include an indication 612 of the specific service back-end nodes at which the operations corresponding to the client's work requests may have to be performed. The indication 612 may be implicit or indirect in at least some implementations, in that the client may not be aware of the layout of the service nodes or (in the case of storage-related services) exactly where the client's data set is stored, but the client may be able to provide a data object name or the name of a container in which the client's data is stored. In at least some embodiments, identification information about the client (e.g., a client identifier or client name) may be sufficient for the endpoint manager to determine which set of back-end nodes may need to be accessed on behalf of the client. For example, a service manager or database may be queried to determine where (i.e., at which back-end nodes 150) the client's data set resides.

In at least one embodiment, the endpoint establishment request may include an indication of the client's redundancy, availability, and/or durability requirements 614 or the client's high-availability requirements. The redundancy, durability and/or availability needs may help determine the number (and location) of DEIs to be established in at least some embodiments. In some embodiments the client may specify or indicate the authentication policy 616 that is to be implemented at the DEIs, e.g., whether per-work-request authentication is to be used, once-per-connection authentication is to be used, null authentication is to be used, or some other authentication technique such as random authentication, account-based authentication, periodic authentication, or time-bounded authentication is to be employed.

Various caching-related client preferences or requirements may be indicated in a caching policy 618 in some embodiments, e.g., in environments where client data is stored by the network accessible service for which the DEI(s) are to be set up. Examples of caching properties that may be specified may include whether caching is to be implemented for reads, writes, both, or neither; whether disk-based caching is to be used, volatile memory caching is to be used, or both types of caching are to be used; the sizes of the cache or caches, cache coherency algorithms or techniques and/or cache filters that may determine which subset of client data is to be cached.

In at least some embodiments, a client may indicate performance requirements 620 for the DEI(s). Performance requirements may include latency limits for various types of work requests, throughput limits (which may differ in some cases from the provisioned throughput capacity limits associated with service back-end nodes, e.g., due to expected cache hit rates or because multiple DEIs may be set up for a given set of back-end nodes), statistical requirements (e.g., variance or standard deviation limits), and the like. The endpoint manager 180 may take such performance requirements into account when determining the resources (e.g., the specific hosts or servers) to be used for the DEIs in at least some embodiments. In some implementations clients may be able to indicate load balancing requirements 622 in the endpoint establishment request as well, e.g., if the client wants one or more dedicated load balancers, an indication to that effect may be included in the request.

In response to the endpoint establishment request 610, in some embodiments the endpoint manager 180 may eventually (e.g., after the appropriate number of DEIs have been started) provide an endpoint establishment response 650. The response may include an indication of the success (or failure) of the request 610, e.g., in the form of a result code 652. In at least one embodiment, the response 650 may include an indication 654 or identification of one or more discovery service nodes 185 that may be queried by the client to determine the network address(es) of the DEIs and/or load balancers set up on the client's behalf. In some implementations, the response 650 itself may include the network addresses 656 of the DEIs and the network addresses 658 of the load balancers, if any, set up. In various embodiments, the endpoint establishment requests 610 and/or the corresponding responses 650 may include other elements not shown in FIG. 6, or may exclude some of the components shown in FIG. 6.

It is noted that in some embodiments, an endpoint manager 180 may be configured to set up DEIs without receiving endpoint establishment requests. For example, in an embodiment in which by default all clients have to use DEIs, the endpoint manager may simply determine some set of default parameters for establishing DEIs, and establish the DEIs accordingly. In at least one embodiment in which the service being used by the client stores client data objects such as tables or volumes, a new DEI may be instantiated when a client requests the creation of a data object. Alternatively, in some implementations, if a DEI D1 was set up earlier for a client (e.g., for a different data object O1), and the endpoint manager determines that D1 is sufficient to handle the work requests for a newly-created data object O2, the client may use the same DEI D1 for accessing multiple data objects. In at least some embodiments, the endpoint manager may set up a pool of endpoint instances at one or more hosts, and assign individual endpoints of the pool to clients as needed.

Methods for Implementing Dedicated Endpoint Instances

Figure 7:
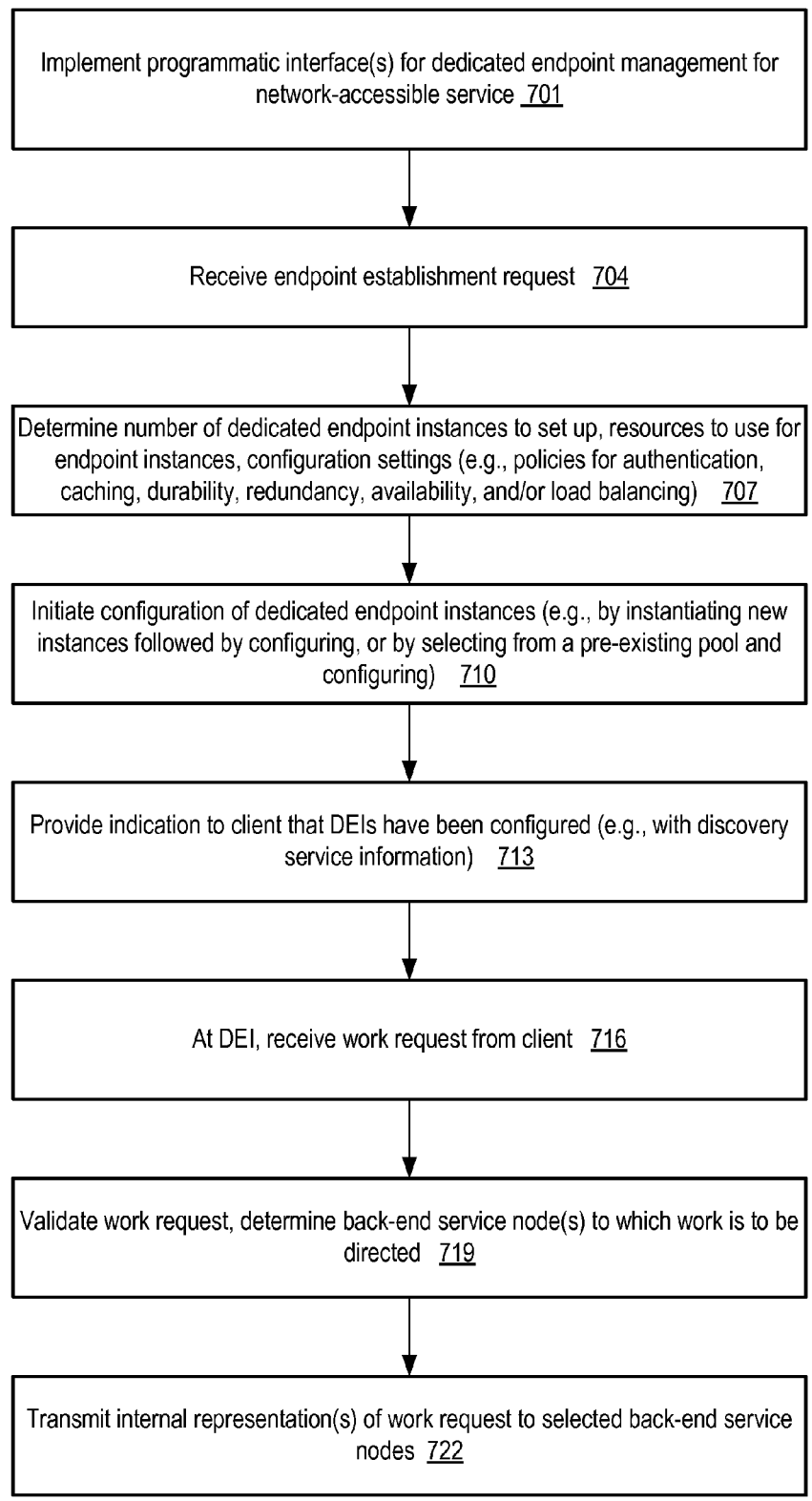
FIG. 7 is a flow diagram illustrating aspects of operations that may be performed to implement dedicated endpoint instances, according to at least some embodiments.

FIG. 7 is a flow diagram illustrating aspects of operations that may be performed to implement dedicated endpoint instances, according to at least some embodiments. As shown in element 701, one or more programmatic interfaces, such as APIs, web pages/sites, graphical user interfaces, or command-line interfaces, may be implemented to enable interactions for dedicated endpoint management in the depicted embodiment. Such interfaces may be implemented by a component of an endpoint manager 180, for example. An endpoint establishment request may be received (element 704), e.g., via one of the programmatic interfaces. The endpoint establishment request may be explicit or implicit in different implementations. For example, in one scenario, when a client submits a request to create a table or a storage volume at a network-accessible service, that creation request may be deemed an implicit endpoint establishment request by the service; in other implementations, dedicated endpoint instances may only be set up in response to explicit requests for such endpoints.

The endpoint manager may determine various parameters, policies and characteristics of the dedicated endpoint instances to be set up on behalf of the client (element 707) in the depicted embodiment. For example, the number of DEIs to be configured may be determined, based on any of various factors such as the provisioned throughput capacity of the client's data objects, redundancy, availability, durability, caching or data durability requirements or policies, performance characteristics of the devices or modules to be used as DEIs, etc. The particular resources at which the DEIs are to be configured may be determined based on any of various factors, such as the proximity of location (with respect to the service nodes to be accessed) of various virtualized hosts, the particular DEI architecture (e.g., independently-hosted DEI, client-hosted-DEI, or back-end DEI) to be used, and the like. Configuration settings for the DEIs, such as caching-related settings, authentication protocol settings, and the like, may be determined, based on the client's preferences and/or on system defaults or heuristics.

Configuration of the DEI(s) may then be initiated (element 710). In some embodiments, this may include launching new virtualized compute servers and then performing the appropriate set of configuration steps on each server. In other embodiments, a pool of re-usable virtualized compute servers (and/or DEI processes) may be established by the endpoint manager, and when a new DEI is to be configured for a client, the pool may be examined to determine if an unused DEI can be assigned to the client. If a currently-unused DEI is available and can meet the needs of the client, the unused DEI may be configured based on the parameters appropriate for the client. The client may be notified that the DEI(s) are accessible for work requests (element 713). In at least some implementations, an indication of a discovery service node or address may be provided to the client, to enable the client to query such a service to identify the network address(es) of the DEIs. In some embodiments, the network addresses assigned to a client's DEIs may change over time due to various reasons, and a discovery service may be the best way for a client to determine the current set of DEI network addresses.

After DEI(s) have been configured, a work request from a client may be received at a particular DEI (element 716). The work request may be validated, e.g., in accordance with the authentication and authorization policies configured for the DEI, and the particular back-end service node or nodes to which corresponding internal representations of work requests are to be directed may be identified (element 719). The representations may then be transmitted to the selected back-end node or nodes (element 722). In some embodiments, clients may indicate (e.g., by specifying particular durability or redundancy requirements) that work requests directed to some or all of their data (e.g., data placed in a DEI cache) are to be processed entirely at the DEIs, at least temporarily, without necessarily saving changes to a back-end nodes. In such scenarios, clients may switch back and forth between using just the DEIs for processing work requests, or using the combination of the DEIs and the back-end nodes, as desired, by changing configuration settings.

Figure 8:
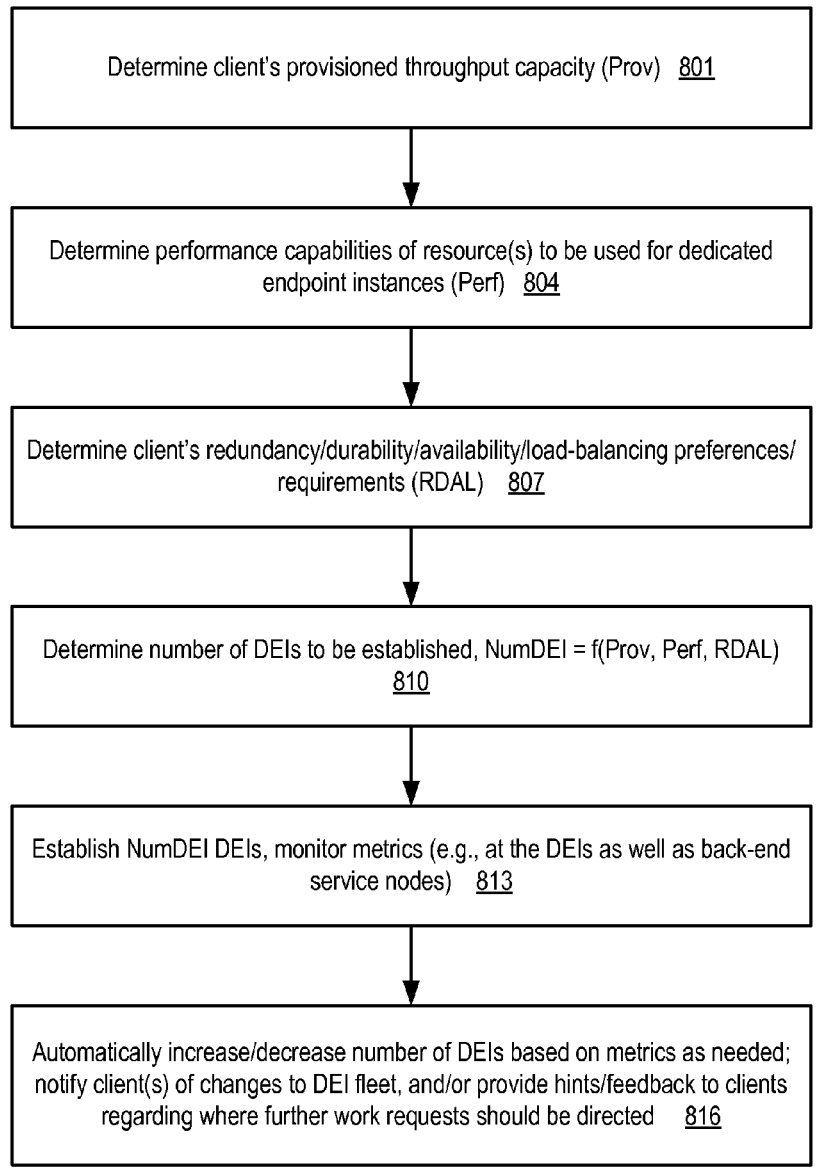
FIG. 8 is a flow diagram illustrating aspects of operations that may be performed to determine the number of dedicated endpoint instances to be established on behalf of a client, according to at least some embodiments.

As indicated above, a number of different factors may influence the number of DEIs that are initially set up for a client, and at least in some embodiments, the number of DEIs may be modified over time. FIG. 8 is a flow diagram illustrating aspects of operations that may be performed to determine the number of DEIs to be established on behalf of a client, according to at least some embodiments. As shown in element 801, the provisioned throughput capacity (Prov) of the client (e.g., of all the tables/partitions of the clients that are to be targeted by the client's work requests) may be determined. The performance capabilities (Perf) of the resources to be used for the DEIs, and the redundancy, durability, high availability, and/or load-balancing requirements (RDAL) for the DEIs may also be determined (elements 804 and 807). The initial number of DEIs to be configured, NumDEI, may then be determined as a function of Prov, Perf and RDAL (element 810) in the depicted embodiment.

NumDEI DEIs may then be configured, and the client may begin submitting work requests to the configured DEIs. For some period of time, various metrics associated with the client's work requests, the DEIs, and/or the back-end service nodes may be monitored (element 813) in the depicted embodiment. Such metrics may include, for example, response latencies, failure or error rates, processor/memory/storage utilization levels at the DEIs/back-end service nodes, and so on. In at least some embodiments, the number of DEIs to be maintained for the client may be automatically scaled up or down as needed, e.g., based on an analysis of the metrics collected (element 816). For example, if the current set of DEIs appear to be overloaded or if the latencies are excessive, additional DEIs may be set up; conversely, if the current set of DEIs appear to be utilized lightly, some number of DEIs may be deactivated. The client may in at least some embodiments be notified when additional DEIs are brought online or taken offline. In at least one embodiment, a given DEI may provide feedback to a client indicating where subsequent work requests should be sent—for example, if a particular DEI DEI1 is loaded heavily while DEI2 is lightly loaded over some measurement interval, DEI1 may include a hint or suggestion in a work request response to a client, indicating to the client that DE2 should preferably be used for subsequent work requests. In some embodiments the number of back-end service nodes may also or instead be modified based on collected metrics.

It is noted that not all the operations illustrated in the flow diagrams of FIGS. 7 and 8 may be implemented in some embodiments, and some operations may be performed in a different order than shown. Additional operations may be performed in some embodiments than are illustrated in FIG. 7 and FIG. 8.

Use Cases

The techniques described above, of using dedicated endpoints for network-accessible services, may be useful in a variety of different scenarios. For example, in some database environments, a very large number of clients may be supported, often with high and unpredictable work request arrival rates. In such environments, it may be the case that at least at some points in time, endpoints that are shared across multiple clients may become overloaded, leading to poor perceived performance even though the back-end service nodes may remain capable of sustaining the incoming work requests. Those clients that wish to ensure a higher probability of meeting strict latency goals and/or other performance goals may wish to have dedicated endpoints set up for their use. The use of dedicated endpoints may also enable more efficient authentication (e.g., more light-weight authentication techniques may be usable if all the work requests emanate from a trusted set of hosts rather than from an unpredictable set of hosts belonging to various clients) as well as client-specific caching, both of which may improve overall performance. In addition to performance advantages, the use of dedicated endpoints may also result in better fault isolation, in that any failures induced by malfunctioning client code or client error may be prevented from affecting other clients.

Illustrative Computer System

Figure 9:
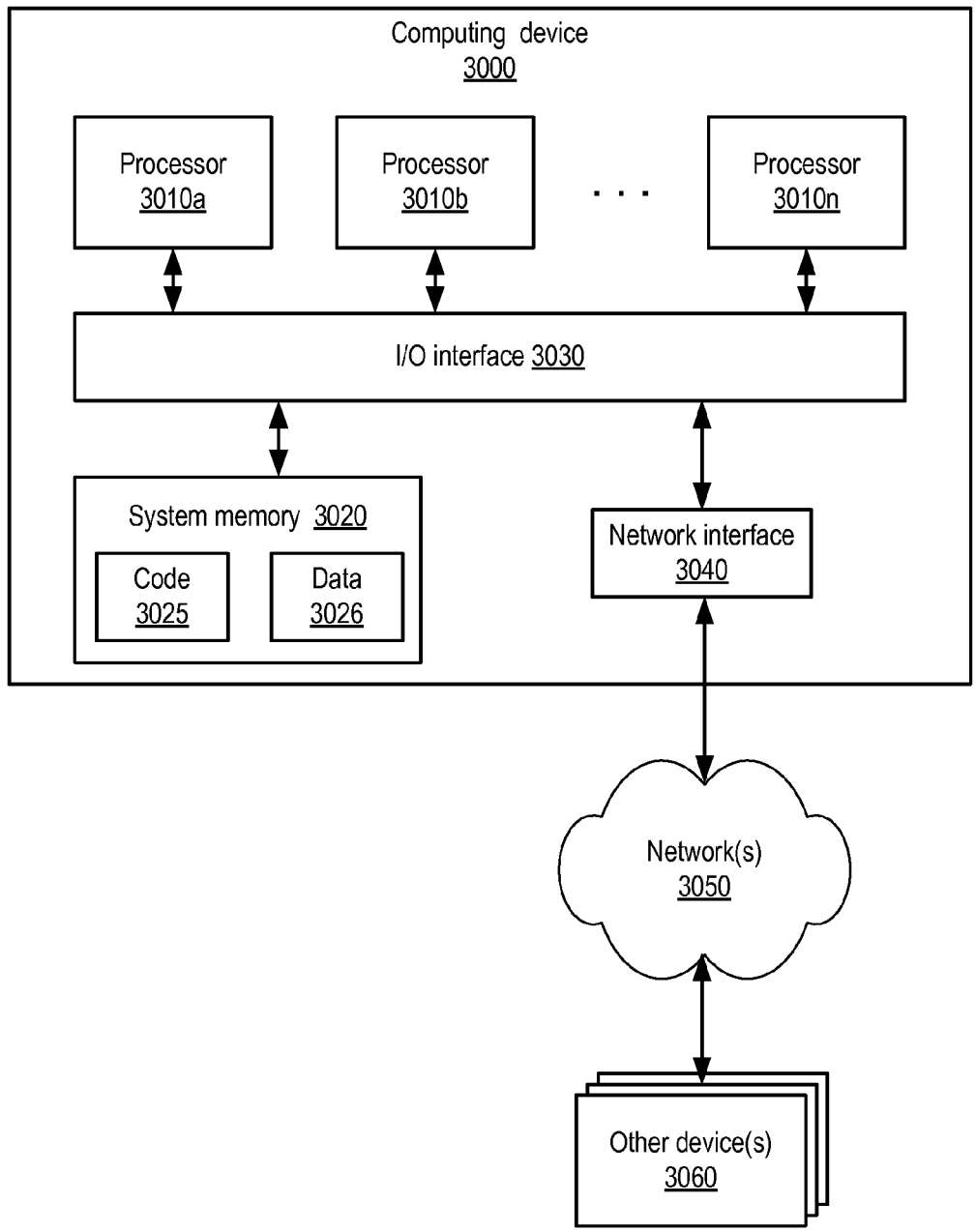
FIG. 9 is a block diagram illustrating an example computing device that may be used in at least some embodiments.

In at least some embodiments, a server that implements a portion or all of one or more of the technologies described herein, including the techniques to implement endpoint managers, dedicated endpoint instances, shared endpoint instances, and back-end service nodes, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more respective processors and memory and configured to:
receive an endpoint establishment request indicating a work target object of a network-accessible service at a provider network to which work requests from a client are to be directed via one or more dedicated endpoint instances;
determine (a) a number of dedicated endpoint instances for the one more dedicated endpoint instances to be established on behalf of the client, (b) a resource at which a particular dedicated endpoint instance of the number of dedicated endpoint instances is to be hosted, and (c) configuration policies for the particular dedicated endpoint instance, the configuration policies including at least one of: a work request authentication policy, a caching policy, a redundancy policy, a load balancing policy, an availability policy, or a durability policy;
initiate configuration of the particular dedicated endpoint instance at the resource according to the configuration policies;
indicate to the client that the particular dedicated endpoint instance has been configured;
receive, at the particular dedicated endpoint instance, a particular work request from the client; and
transmit a representation of the particular work request to one or more back-end service nodes of the network-accessible service at which at least a portion of the work target object is managed;

wherein the particular dedicated endpoint instance handles the work requests from no more than a single client, and at least one of the one or more back-end service nodes receiving the representation of the particular work request handles other work requests from multiple clients.

2. The system as recited in claim 1, wherein the network-accessible service is configured to store one or more data objects of the client including the work target object, and wherein the caching policy comprises one or more of: (a) a size of a cache to be established at the particular dedicated endpoint instance to store at least a portion of the one or more data objects, (b) a cache filter indicative of a subset of the one or more data objects to be cached, or (c) a cache coherency protocol to be utilized by a plurality of dedicated endpoint instances established on behalf of the client.

3. The system as recited in claim 1, wherein the resource comprises at least one of: (a) a server instantiated by a different network-accessible service of the provider network on behalf of the client, (b) a particular back-end service node of the network-accessible service, or (c) a client host at which an application component that generates the particular work request is executed.

4. The system as recited in claim 1, wherein the number of dedicated endpoint instances to be established on behalf of the client is determined based at least in part on one or more of: (a) a provisioned throughput capacity configured at the network-accessible service for the work requests of the client, (b) the redundancy policy, (c) a performance capability associated with the resource to be used to host the particular dedicated endpoint instance, (d) the availability policy, (e) the durability policy, or (f) the load balancing policy.

5. The system as recited in claim 1, wherein the work request authentication policy comprises an indication of one or more of: (a) once-per-connection authentication, (b) per-work-request authentication, (c) time-bounded authentication, according to which a given work request is selected for authentication based at least in part on an amount of time elapsed since a different work request was authenticated, (d) periodic authentication, according to which a given work request is selected for authentication based at least in part on the number of requests that have been received since a different work request was authenticated, (e) account-based authentication, according to which a given work request is selected for authentication based at least in part on a client account associated with the given work request, (f) random authentication, according to which a work request is chosen for authentication based at least in part on random selection, or (g) null authentication, according to which authentication checks are not to be performed at the particular dedicated endpoint instance.

6. A method, comprising:
performing, by one or more computing devices:
receiving an endpoint establishment request indicating a network-accessible service at a provider network to which work requests from a client are to be directed via one or more dedicated endpoint instances;
determining (a) a number of dedicated endpoint instances for the one more dedicated endpoint instances to be established on behalf of the client, and (b) configuration policies for a particular dedicated endpoint instance to be established on behalf of the client, including at least one of: a work request authentication policy, a caching policy, a redundancy policy, a durability policy, an availability policy, or a load balancing policy;

initializing configuration of the particular dedicated endpoint instance according to the configuration policies;

receiving, at the particular dedicated endpoint instance, a particular work request from the client; and transmitting a representation of the particular work request to one or more back-end service nodes of the network-accessible service;

wherein the particular dedicated endpoint instance handles the work requests from no more than a single client, and at least one of the one or more back-end service nodes receiving the representation of the particular work request handles other work requests from multiple clients.

7. The method as recited in claim 6, wherein the network-accessible service is configured to store one or more data objects of the client, and wherein the caching policy comprises one or more of: (a) a size of a cache to be established at the particular dedicated endpoint instance to store at least a portion of the one or more data objects, (b) a cache filter indicative of a subset of the one or more data objects to be cached, or (c) a cache coherency protocol to be utilized by a plurality of dedicated endpoint instances established on behalf of the client.

8. The method as recited in claim 6, further comprising performing, by the one or more computing devices:

determining a resource at which the particular dedicated endpoint instance is to be hosted, wherein the resource comprises at least one of: (a) a resource instantiated by a different service of the provider network on behalf of the client, (b) a particular back-end service node of the network-accessible service, or (c) a client host at which an application component that generates the particular work request is executed.

9. The method as recited in claim 8, further comprising: configuring the particular back-end service node for exclusive use by a set of devices associated with the client.

10. The method as recited in claim 8, further comprising: instantiating the particular dedicated endpoint instance using a library component installed at the client host.

11. The method as recited in claim 6, wherein the number of dedicated endpoint instances to be established on behalf of the client is determined based at least in part on one or more of: (a) a provisioned throughput capacity configured at the network-accessible service for the work requests of the client, (b) the redundancy policy, (c) a performance capability associated with a resource to be used to host the particular dedicated endpoint instance, (d) the availability policy, (e) the durability policy, or (f) the load balancing policy.

12. The method as recited in claim 6, wherein the work request authentication policy comprises an indication of one or more of: (a) once-per-connection authentication, (b) per-work-request authentication, (c) time-bounded authentication, according to which a given work request is selected for authentication based at least in part on an amount of time elapsed since a different work request was authenticated, (d) periodic authentication, according to which a given work request is selected for authentication based at least in part on the number of requests that have been received since a different work request was authenticated, (e) account-based authentication, according to which a given work request is selected for authentication based at least in part on a client account associated with the given work request, (f) random authentication, according to which a work request is chosen for authentication based at least in part on random selection, or (g) null authentication, according to which authentication checks are not to be performed at the particular dedicated endpoint instance.

13. The method as recited in claim 6, further comprising performing, by the one or more computing devices:

providing an indication to the client of an endpoint discovery service to be queried by the client to obtain a network address of the particular dedicated endpoint instance.

14. The method as recited in claim 6, wherein the number of dedicated endpoint instances comprises a plurality of dedicated endpoint instances, further comprising performing, by the one or more computing devices:

establishing one or more load balancers to distribute client work requests among the plurality of dedicated endpoint instances in accordance with the load balancing policy.

15. The method as recited in claim 6, wherein the number of dedicated endpoint instances comprises a plurality of dedicated endpoint instances, further comprising performing, by the one or more computing devices:

determining, based at least in part on one or more metrics collected from at least one of (a) a dedicated endpoint instance of the plurality of dedicated endpoint instances or (b) a back-end service node of the one or more back-end service nodes of the network-accessible service, to implement a change to the number of dedicated endpoint instances to be maintained on behalf of the client; and implementing the change to the number of dedicated endpoint instances.

16. A non-transitory computer-accessible storage medium storing program instructions that when executed on one or more processors:

determine a number of dedicated endpoint instances to be established on behalf of a client of a network-accessible service to process work requests from the client;

determine configuration policies for a particular dedicated endpoint instance of the number of dedicated endpoint instances, wherein the configuration policies include at least one of: a work request authentication policy, a caching policy, a redundancy policy, a durability policy, an availability policy, or a load balancing policy;

initiate configuration of the particular dedicated endpoint instance according to the configuration policies; and provide an indication to the client that the particular dedicated endpoint instance has been configured;

wherein the particular dedicated endpoint instance handles the work requests from no more than a single client, and at least one back-end service node servicing work requests sent to the particular dedicated endpoint instance also services other work requests from multiple clients.

17. The non-transitory computer-accessible storage medium as recited in claim 16, wherein the network-accessible service comprises a provisioned-throughput database service.

18. The non-transitory computer-accessible storage medium as recited in claim 16, wherein the instructions when executed by the one or more processors:

implement one or more programmatic interfaces enabling the client to submit an endpoint establishment request; and wherein the instructions when executed on the one or more processors determine the configuration policies in response to receiving the endpoint establishment request via a particular programmatic interface of the one or more programmatic interfaces, wherein the endpoint establishment request comprises one or more parameters indicative of a configuration requirement for the particular dedicated endpoint instance.

19. The non-transitory computer-accessible storage medium as recited in claim 16, wherein the network-accessible service is configured to store one or more data objects of the client, wherein the caching policy comprises one or more of: (a) a size of a cache to be established at the particular dedicated endpoint instance to store at least a portion of the one or more data objects, (b) a cache filter indicative of a subset of the one or more data objects to be cached, or (c) a cache coherency protocol to be utilized by the number of dedicated endpoint instances established on behalf of the client.

20. The non-transitory computer-accessible storage medium as recited in claim 16, wherein the work request authentication policy comprises an indication of one or more of: (a) once-per-connection authentication, (b) per-work-request authentication, (c) time-bounded authentication, according to which a given work request is selected for authentication based at least in part on an amount of time elapsed since a different work request was authenticated, (d) periodic authentication, according to which a given work request is selected for authentication based at least in part on the number of requests that have been received since a different work request was authenticated, (e) account-based authentication, according to which a given work request is selected for authentication based at least in part on a client account associated with the given work request, (f) random authentication, according to which a work request is chosen for authentication based at least in part on random selection, or (g) null authentication, according to which authentication checks are not to be performed at the particular dedicated endpoint instance.

\* \* \* \* \*